Oct. 19, 1954 — J. H. BREISCH — 2,691,826
MEASURING INSTRUMENT HAVING OPPOSED
CONTACTS AND OPTICAL LEVERS
Filed Aug. 10, 1948 — 5 Sheets-Sheet 1

INVENTOR.
John H. Breisch
BY
Bates, Teare & McKelvey
Attorneys

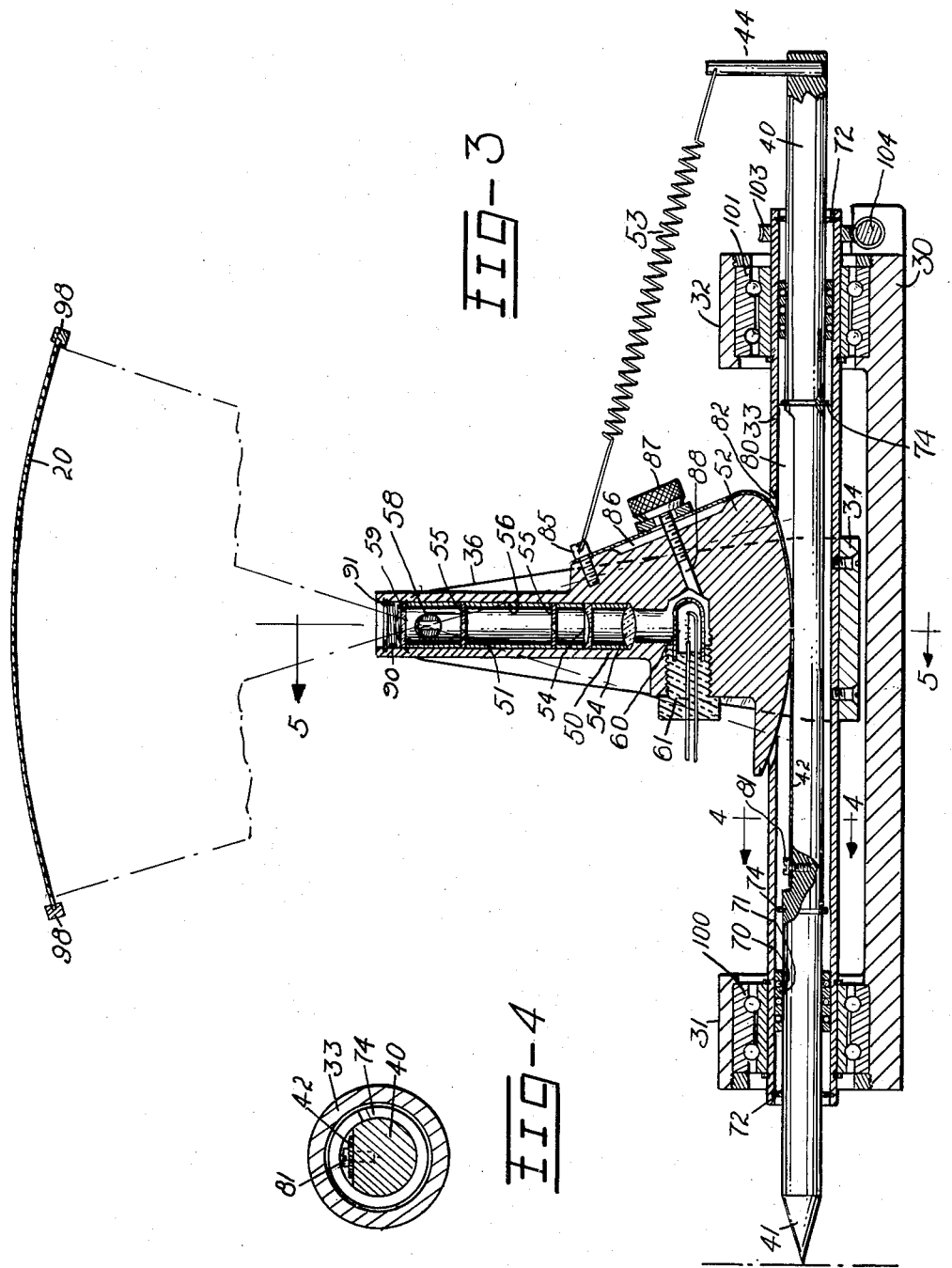

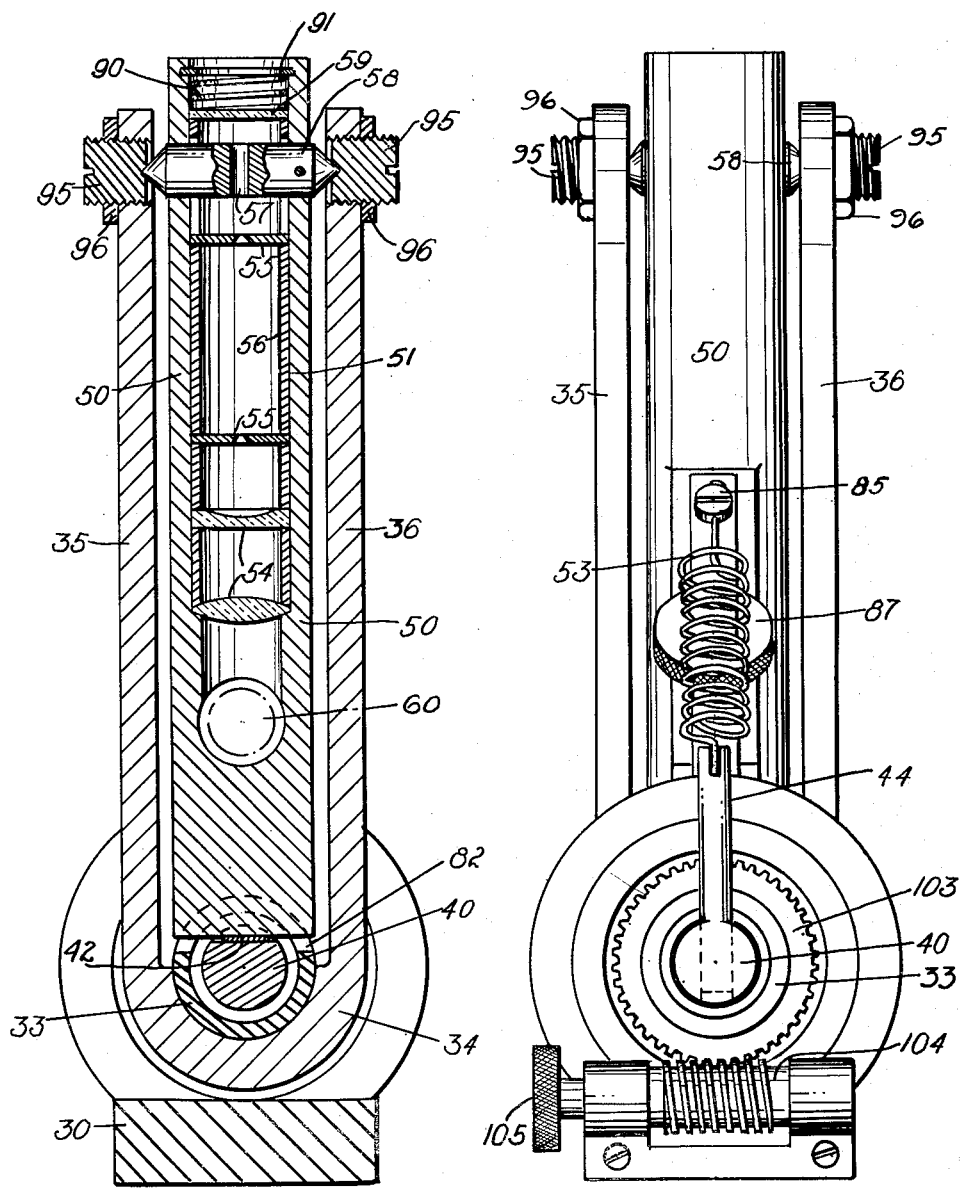

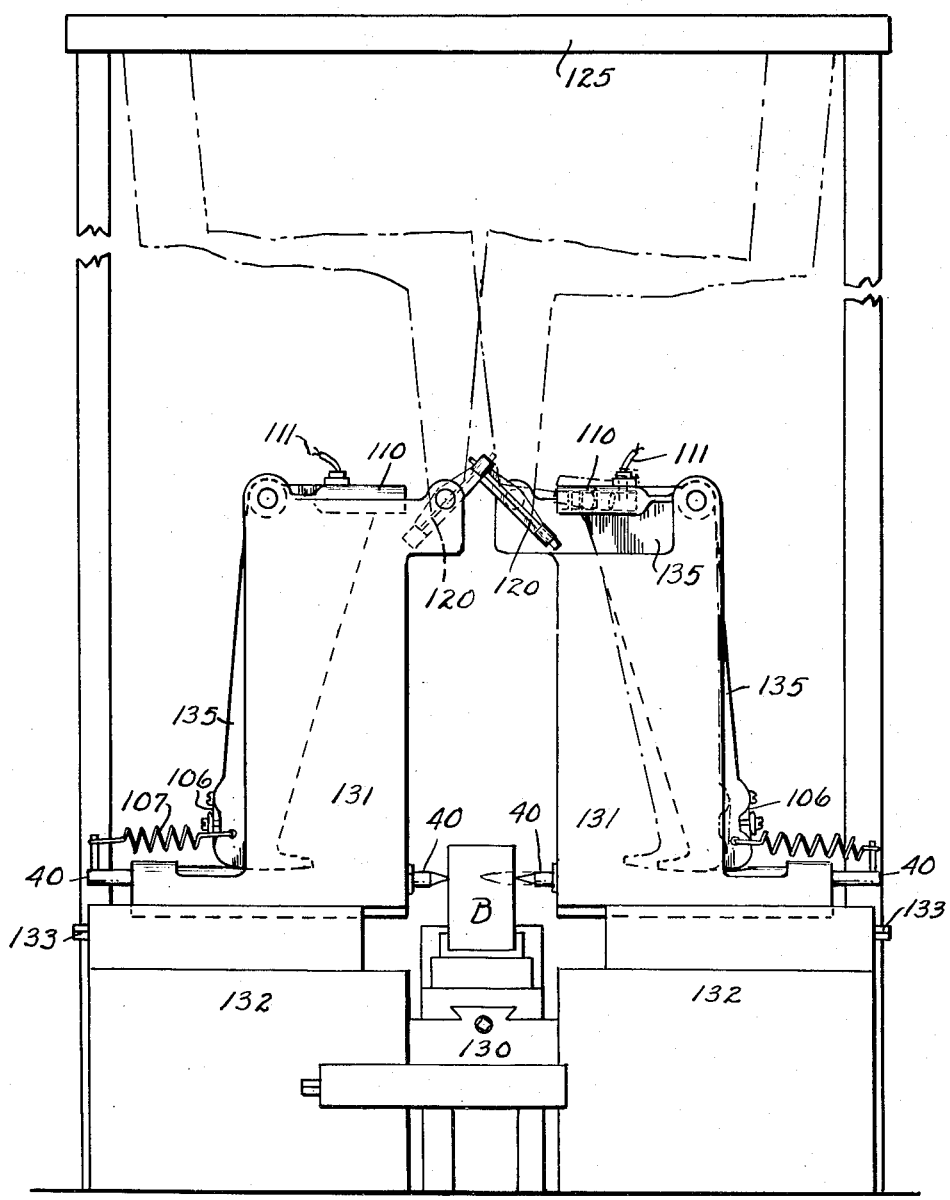

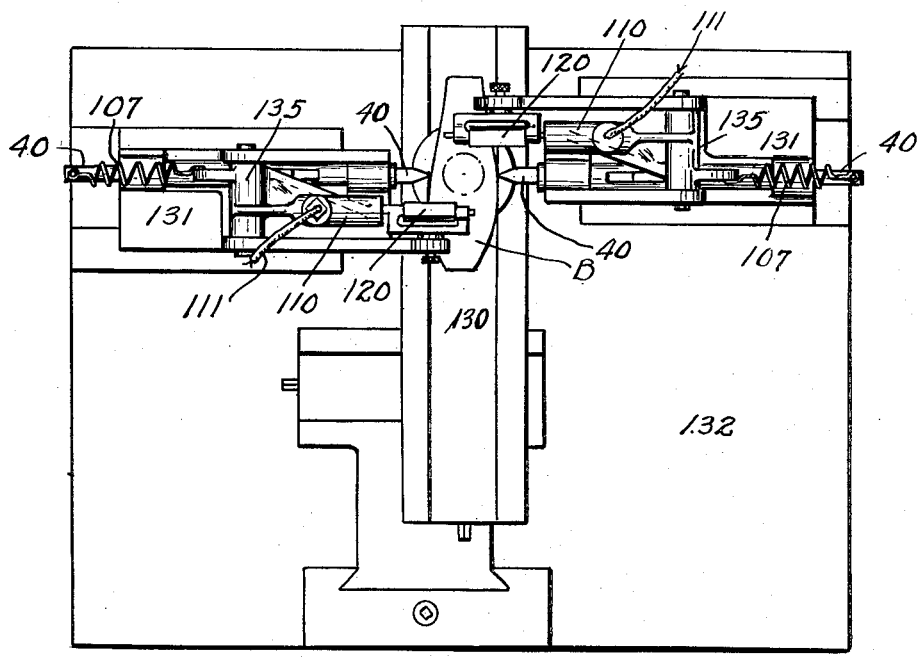

Patented Oct. 19, 1954

2,691,826

UNITED STATES PATENT OFFICE 2,691,826

MEASURING INSTRUMENT HAVING OPPOSED CONTACTS AND OPTICAL LEVERS

John H. Breisch, Lakewood, Ohio, assignor to Measuring Machines, Inc., Cleveland, Ohio, a corporation of Ohio Application August 10, 1948, Serial No. 43,473

14 Claims. (Cl. 33—147)

This invention relates to a recording measuring instrument of the optical type having a feeler adapted to engage the object to be measured and a movable device controlled by the movement of such feeler and directing a ray of light on a suitable screen either for visual observation or for photographically making a permanent record. The general object of my invention is to provide such an instrument in a thoroughly reliable form capable of accurately directing an indication on the screen according to the measurement of the article being tested.

Another object of the invention is to render the instrument self-contained by so devising it that a single movable member carries both the source of illumination and the means for directing the ray of light therefrom onto the screen. Accuracy in the transmission of movement from the feeler to the light-directing means is also a feature of my invention. Still another feature is provision of means to enable the instrument to be readily set in any desired position, to locate any desired field to be illuminated on the screen and to change such field from time to time.

Two preferred forms of my instrument are shown in the accompanying drawings and are hereinafter fully described in detail and the essential novel features are summarized in the claims.

Figure 1:
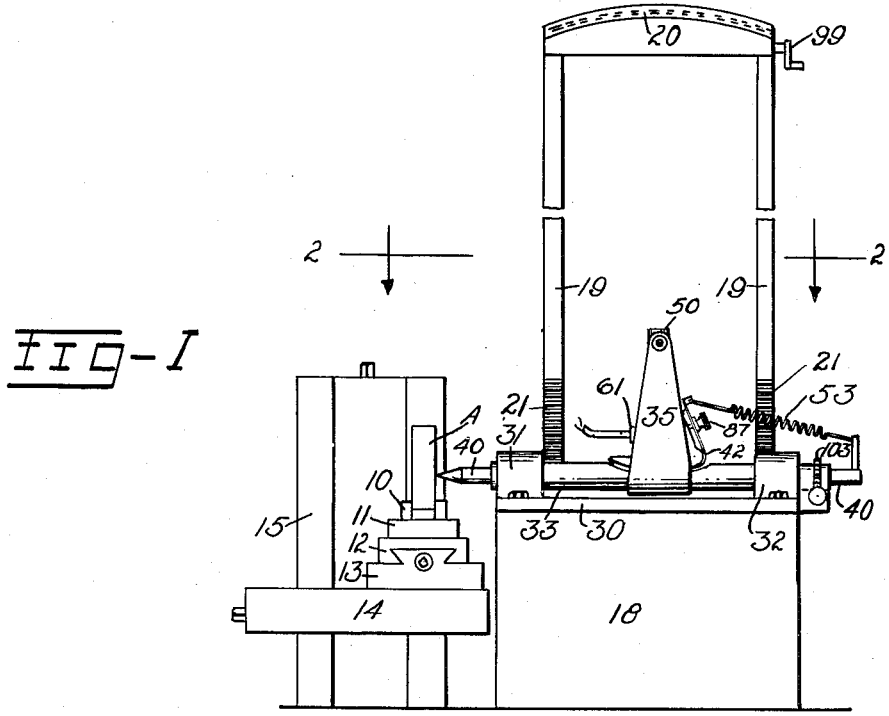
Figure 2:
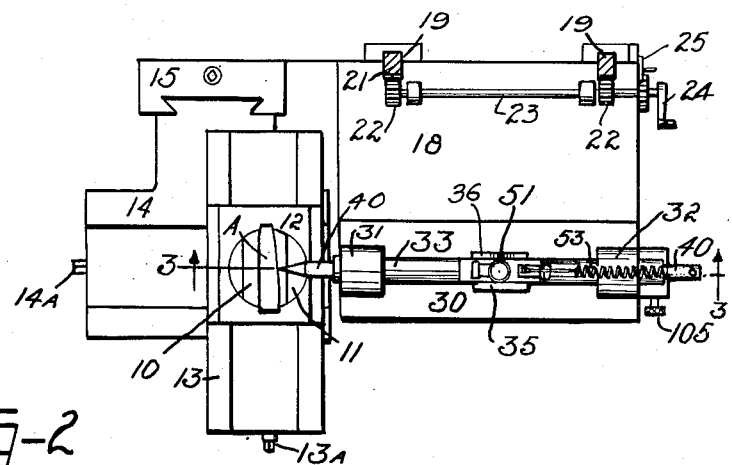

In the drawings, Fig. 1 is an elevation of the first form of my complete measuring apparatus partly broken away; Fig. 2 is a horizontal section, for instance, on the line 2—2 in Fig. 1; Fig. 3 is a vertical section through the recording instrument in position engaging an object indicated by the broken line at the extreme left, the plane being indicated by the line 3—3 on Fig. 2; Fig. 4 is a detail in cross section through the supporting tube of the instrument, as indicated by the line 4—4 on Fig. 3; Fig. 5 is an enlarged vertical section of the carrier for the optical barrel, as indicated by the line 5—5 on Fig. 3; Fig. 6 is an end view of the instrument on the same scale as Fig 5; Fig. 7 is an elevation of a pair of my instruments arranged to engage opposite sides of a single object and transmit their result to a single screen; Fig. 8 is a plan of the embodiment of Fig. 7 with the screen omitted.

I will describe first the embodiment illustrated in Figs. 1 to 6 inclusive, much of which description will apply also to Figs. 7 and 8. As indicated somewhat conventionally in Figs. 1 and 2, A indicates the object to be measured, shown as clamped by a suitable clamp 10 on a turntable 11 which is mounted on a slide 12, which is horizontally movable on a lower slide 13. The latter slide is horizontally movable, at right angles, to the movement of the slide 12, on a bracket 14 and this bracket is vertically movable on a suitable standard 15. By this means the object A can be effectively positioned by movement in any one of three directions at right angles to each other or turned on an axis.

It is to be understood that suitable means, not shown, but indicated by the angular end 13a of a shaft on the slide 13, will be provided for moving the slide 12 across the end of the feeler of my instrument to be described. Also suitable means, not shown, but indicated by the angular end 14a of a shaft on the slide 14, will serve to raise that slide to bring a new region of the object into position for coaction with the feeler.

Associated with the slides described is a suitable supporting block 18 which carries the measuring instrument about to be described and which by coaction with the article A directs a ray of light on a suitable screen indicated at 20 and shown as movably mounted on standards 19 rising from the block 18.

The frame of the instrument comprises a horizontal bed plate 30 resting on and secured to the top of the block 18. This bed plate carries a pair of spaced upwardly extending sleeve portions 31 and 32 in which is mounted a tube 33. The tube rigidly carries a bracket 34 having a pair of parallel arms 35 and 36 which provide bearings for a swinging carrier 50 having the optical barrel to be described.

Mounted in the tube 33 and longitudinally movable therein is a rod 40, one end of which is formed into a point 41 adapted to engage the object A to be measured. A flexible steel strap 42 connects the rod with a convex heel portion 52 of the swinging carrier. This strap is always maintained taut by a tension spring 53, connecting such heel portion with a pin 44 on the rod 40. The result is that as the rod 40 moves back and forth according to variations in the contour of the movably mounted object A the optical barrel is swung correspondingly on its pivot.

Mounted in a bore in a tubular portion 51 of the carrier 50 is the optical barrel comprising suitable lenses 54 and suitable diaphragms 55 and tubular means 56 for holding them in spaced relation. A small central hole 57 through the pivot pin 58, by which the carrier is mounted in the bracket arms 35 and 36, emits the ray of light from a source of light 60 in the carrier back of the first lens. This ray after crossing the pin 58 passes out through a final glass plate 59. The source of light comprises an electric lamp 60 carried by a suitable plug 61 screw threaded into the heel portion 52 of the carrier.

It will be seen from the brief description given that longitudinal movements of the feeler rod 40 are translated into swinging movements of the carrier 50, and this correspondingly positions the ray of light striking the screen 20. I thus produce on that screen either an image the position of which may be visually observed or a chemical effect on a photographically receptive surface which when subsequently developed would give an accurate permanent record of the movements of the rod 40.

It is to be understood that the mechanism for moving the slides may periodically move the object horizontally, and then after the pointer has traced across the entire region to be measured a vertical movement may present a new region for measurement. The screen may be moved longitudinally in correspondence with the vertical movement of the object, so that one line of images on the screen may correspond to a line of measurements on the article. The mechanisms for moving the article and for moving the screen are not shown as they are usual in this type of apparatus and may be of any approved form.

Coming now to further details of my instrument above generally described, it will be seen that the shiftable rod 40 is mounted within the tube 33 by ball bearings enabling free longitudinal movement of the rod. I have shown a number of annular rows of balls 70 for this purpose. These balls may be spaced by separating rings, as indicated at 71. The balls and rings are retained longitudinally by inwardly directed collars 72 on the tube 33 and outwardly directed collars 74 on the rod coacting with opposite ends of the train of balls. This mechanism holds the rod accurately in its axial position but allows it to move freely in either direction.

The steel strap 42 connecting the rod with the pivoted carrier 50 is shown as having an end portion occupying a longitudinal recess 80 in the rod and attached to the rod by a screw 81 at the end of the recess.

The carrier 50 has its heel portion 52 extending through an open longitudinal slot 82 in the tube 33. The heel portion of the carrier is curved at its far end concentrically about the axis of the pivot 58 and the strap 42 lies against the curved end of this heel and then extends up alongside of the carrier and is finally anchored to the carrier by a screw 85. This screw may also form the anchorage for that end of the tension spring 53.

To adjust accurately the effective length of the steel strap 42, I provide a recess 86 in the carrier over which the strap extends and I provide a knurl-headed screw 87 passing through a slot in the strap and threaded into an internally threaded recess 88 in the carrier. Accordingly, as this screw is turned in, the strap is diverted inwardly and thereby in effect shortened between the two anchorages 81 and 85, thus positioning the carrier accurately with reference to the point 41 of the rod.

The optical barrel which comprises the lenses and diaphragms properly spaced seats in an enlarged bore in the tubular portion 51 of the carrier. It is preferably made up of a series of short cylindrical tubes 56, and the different lenses and diaphragms having external diameter substantially the same as the external diameter of these short tubes, with the result that one lens may be put in place in the tubular portion of the carrier against the shoulder at the end of the larger bore thereof, then a short cylindrical spacing tube put in place, then another lens across the end of such short tube, then another short tube, then one of the diaphragms, and so on until the entire optical barrel is completed beyond the pivot pin 58 by the final glass plate 59. A suitable coil spring 90 bearing against this glass plate and held by a split spring washer 91 occupying an annular groove in the barrel 51 completes the assemblage of this portion of the instrument.

The pivot pin 58 for the optical member is shown as a pin rigidly mounted in the barrel portion 51 of the carrier and having conical points at its opposite ends which rest in suitable depressions in a pair of carrying blocks 95 which are shown as threaded in the two arms 35 and 36 and locked by jams nuts 96.

The screen 20, as indicated in Figs. 1 and 3, is held in an arc concentric of the pivotal axis of the optical barrel, with the result that there is always a uniform distance from such pivotal axis to any portion of the screen onto which the light may be directed. To obtain a proper focusing of the light ray on the screen, I may put a focusing lens (not specifically shown) in the lens barrel or I may move the screen toward and from the barrel. The latter means is indicated in the drawing as racks 21 formed on the screen supporting uprights 19 and coacting with pinions 22 on a shaft 23 which may be turned, as desired, by hand crank 24. A suitable pawl or other means 25 may lock this adjusting mechanism in any set position.

The screen may also be moved longitudinally to bring fresh regions thereof periodically into the range of the delivered light. This is indicated in Figs. 1 and 3, where 98 designates suitable guides along which the screen may be moved and 99 a crank operating mechanism (not specifically shown) for moving the screen.

To initially locate the image on the screen, as well as to provide means for successively changing the region of indication if it is not desired to move the screen itself, I provide for swinging the whole instrument on the axis common to the feeler rod 40 and supporting tube 33. To allow this tube to be turned with the rod I mount the tube in ball bearings 100 and 101 suitably carried within the frame supporting sleeves 31 and 32. I provide the sleeve with a worm wheel 103 fixed thereon and I provide in the base frame 30 a manually operable worm 104, meshing with the worm wheel. The worm is shown as provided with a knurled knob 105 by which it may be manually turned as desired. This will turn the whole instrument in its frame 30 to position the region for the formation of the optical images on the screen.

I have described the instrument operating on only one face of the object to be measured as indicated in Figs. 1 and 2. However, it is a simple matter to provide two of the instruments facing in opposite directions and acting simultaneously to engage opposite sides of the object. Such an instrument is illustrated in Figs. 7 and 8. These figures also show somewhat different arrangements for the lens barrel and transmission of light to the screen, as about to be explained.

In Figs. 7 and 8, there is shown a multiple slide 130, substantially as heretofore described, adapted to support the object and to turn it or shift it in any direction, the object being shown at B. On opposite sides of this object I mount two of my instruments with their feelers 40 engaging directly opposite points on the object. Two instruments carrying these feeler rods are identical and are arranged in staggered position as shown in Fig. 8. As shown in Figs. 7 and 8, each of the instruments has an individual frame 131 slidably mounted on a general bed 132 and positioned thereon by suitable shifting means indicated by the projecting angular head 133 of a screw or other member for effecting the shifting.

Pivoted in each frame 131 is a swinging carrier 135 corresponding to the carrier 50 of Fig. 3 and connected by a flexible strap 106 with the shifting feeler rod as already described. A spring 107 connecting the swinging carrier with the feeler rod maintains the strap taut and also maintains the point of the rod against the object. The swinging carrier 135 carries a source of illumination and a lens barrel for projecting a light on the screen.

In this latter embodiment I prefer to mount the lens barrel 110 at right angles to the general direction of the carrier 135 instead of lengthwise of it as in Fig. 3. This enables the light from the two lens barrels to be projected toward an intermediate region. The interior of each lens barrel may be identical with that shown in Fig. 3 and the illumination is by a lamp carried in the rear of the lenses and fed by an electric conductor 111.

Each frame member 131 carries a mirror 120 set at about 45° to the direction of the light from the corresponding lamp. These mirrors, therefore, direct such light onto the screen, indicated conventionally at 125. The screen may be transversely concaved and may be longitudinally movable if desired. As will be seen from Fig. 8, the two mirrors 120 are spaced from each other so that neither interferes with the other, but they serve to project images onto the screen in the same general region but sufficiently spaced so as to cause no confusion. Accordingly, I can by this embodiment obtain a single visual disclosure on the screen or a single photographic record showing the measurement of both sides of the object.

It is to be understood that while I have illustrated my invention with the carriers swinging in vertical planes and on horizontal pivots and the screen overhead, the same mechanism may be used with the carrier in a horizontal plane on a vertical pivot, enabling the screen to extend vertically in a readily observable position and may then be carried if desired by suitable mechanism mounted on the wall of a room.

It will be seen from the description given above that my instrument is very compact and contains within itself not only the feeling mechanism but also the means operated thereby to shift the optical axis in correspondence with the feeler and at the same time maintain the source of illumination in line with such axis. The parts are adapted for accurate adjustment in assembling the device, and when assembled the movements are effected with a minimum of friction. The optical parts of the instrument are very readily mounted and held in position and readily changed should occasion require.

The instrument may be used singly for one side of the object or in double form to measure both sides and in either case the individual instrument may be of the form shown in Fig. 3 or that indicated in either half of Fig. 7.

I claim:

1. In a measuring instrument, the combination of a longitudinally movable feeler, a pivotally mounted member, a flexible strap connected at one end to the feeler and at the other end to said member, said strap extending across a recess in the member and anchored thereto beyond the recess, and means for diverting the strap into the recess to shorten the effective length thereof.

2. The combination of a movable feeler rod, a pivotally mounted carrier, flexible means independently connecting the carrier to each end of the feeler rod for swinging movement about its pivot in response to corresponding movement of the feeler rod, and a source of illumination mounted on the carrier, the carrier being provided with an axial passageway leading from the source of illumination along an axis intersecting the pivotal axis of the carrier.

3. In a measuring machine, the combination of means for holding an object to be measured, a longitudinally movable feeler rod adapted to engage the object, a spring pressing the rod against the object, a pivotally mounted carrier carrying a source of illumination and a lens, a flexible strap connecting the rod and carrier, said spring being connected to the rod and carrier independently of the strap and adapted to maintain the strap in taut condition as well as maintain the feeler rod in engagement with the object.

4. The combination of a means for holding an object to be measured, a longitudinally movable feeler rod, a pivotally mounted carrier having a surface concentric with its pivot, a flexible strap connected at one end to the carrier and extending about said curved surface and leading therefrom tangentially to the feeler rod and connected at its other end to one end of the rod, a tension spring interconnecting the other end of said rod and carrier independently of the strap, and means for giving an indication under the control of said pivoted carrier.

5. In a measuring instrument, the combination of means for holding an object to be measured, a feeler rod mounted in bearings for longitudinal movement toward and from said object and positioned to have its end engage the object, means for moving the object in a path normal to the axis of a feeler rod, a pivotally mounted carrier having an optical barrel for directing a ray of light, said carrier having a convex edge concentric with the pivotal axis of the carrier, and a flexible strap anchored at one end to the carrier and extending thence along the convex edge of the carrier and anchored at its other end to the rod.

6. An instrument for simultaneously reproducing correlated measurements of opposite faces of an object on a common indicating screen comprising, a pair of aligned longitudinally movable feelers positioned to simultaneously engage opposite sides of the object in predetermined relation to each other and the object, a pair of pivoted carriers each connected with one of the feelers and adapted to be moved thereby respectively, lens barrels mounted on the respective carriers in alignment with the pivotal axes of the carriers and each discharging light in generally opposite directions from sources of illumination carried by the carrier, each of said lens barrels being out of alignment with the other to provide relatively displaced light rays, and a pair of mirrors each arranged to direct the light from a single lens barrel in spaced relation onto the same screen.

7. A machine for measuring dimensions of a solid object comprising, the combination of means for carrying such object, a movable feeler having one end adapted to engage the object, a pivotally mounted carrier, a lens barrel carried thereby, flexible means independently connecting the carrier with each end of the feeler rod for regular swinging movement about its pivot in response to a corresponding movement of the feeler rod, and a source of illumination mounted in the lens barrel, the barrel being provided with an axial passageway leading from the source of illumination through the lens along an axis intersecting the pivot of the carrier.

8. In a measuring instrument, the combination of a tube, a feeler rod supported for axial movement within the tube and spaced from the interior thereof, a rolling bearing freely carried between the rod and the interior of the tube and engaging both of said members, said bearing comprising an annular row of balls surrounding the rod, said tube having an internally directed stop on one side of the bearing and said rod having an externally directed stop on the other side of the bearing to limit the axial travel of said balls as the rod is axially shifted within the tube, and an indicating device operated by the shifting of said rod.

9. In a measuring instrument for simultaneously measuring and reproducing correlated measurements of opposite sides of an object on a common screen comprising, the combination of a frame, a pair of aligned feelers slidably mounted in said frame for movement to and from each other with their axes in a common straight line, means for supporting a work-piece between said feelers for reciprocating movement in a straight line extending in a direction normal to said first-named straight line, a pair of light ray sources mounted on said frame, each source being mounted for independent pivotal movement, flexible means independently connecting each light ray source with opposite ends of a respective feeler to swing said source about its pivot in response to the corresponding movement of its feeler, means holding a screen, and means for directing the rays from said two light sources onto said screen in adjacent but non-interfering correlated position thereon.

10. In a measuring instrument, the combination of a longitudinally movable feeler rod having one end adapted to engage an object to be measured, an optical system carrier supported for pivotal movement relative to the feeler rod, a flexible strap connecting the carrier to one end of the feeler rod for pivotal carrier movement proportional to longitudinal rod movement in one direction, and tension means independently connecting the carrier to the other end of said rod for pivotal carrier movement proportional to longitudinal rod movement in the other direction, said tension means coacting between the carrier pivot and said rod to urge the rod into constant engagement with the object being measured.

11. The measuring instrument of claim 10 including a frame having spaced bearings and a tube rotatably mounted therein and a bracket fixedly mounted to the tube and wherein said feeler rod is slidably mounted within the tube and said carrier is pivoted to the bracket, and further including means for holding the tube in various angular positions in its bearing.

12. The measuring instrument of claim 10 including a tube mounted for rotation having a worm wheel therein and including a worm for turning the worm wheel and holding it in any desired position, and said feeler rod being slidably mounted within the tube and said carrier pivotally supported by the tube.

13. The measuring instrument of claim 10 including a frame having a pair of spaced bearings, a tube rotatably mounted in the bearings, and means for turning the tube on its axis and holding it in any desired position, said feeler rod extending axially through the tube and roller bearings freely supported between the rod and the interior of the tube, a bifurcated bracket carried by the tube, said carrier being pivotally mounted on the bracket and having an optical barrel extending across the pivotal axis of the carrier in a direction toward the feeler rod, and a source of illumination carried by the carrier behind the optical barrel.

14. The measuring instrument of claim 10 including a frame having means thereon to support and move a workpiece, said feeler rod being slidably mounted in said frame for movement to and from the workpiece in a straight line extending in a direction normal to the direction of movement of the workpiece, and said optical system carrier having a light ray source pivotally mounted on the frame and including means to swing the light ray source about the axis of the feeler without disturbing the relation between the source and the feeler.

References Cited in the file of this patent

UNITED STATES PATENTS

| Number | Name | Date |
|---|---|---|
| 1,157,796 | Morehouse | Oct. 26, 1915 |
| 1,387,825 | Aldeborgh | Aug. 16, 1921 |
| 1,405,852 | Maag et al. | Feb. 7, 1922 |
| 1,422,161 | Woodrow | July 11, 1922 |
| 1,467,403 | Toomey | Sept. 11, 1923 |
| 1,477,206 | Blood | Dec. 11, 1923 |
| 1,485,154 | Aldeborgh | Feb. 26, 1924 |
| 1,686,263 | Bristol | Oct. 2, 1928 |
| 2,144,653 | Graff | Jan. 24, 1939 |
| 2,214,682 | Spacher | Sept. 10, 1940 |
| 2,311,815 | Briney | Feb. 23, 1943 |
| 2,370,220 | Aller et al. | Feb. 27, 1945 |
| 2,400,840 | Peters | May 21, 1946 |
| 2,507,727 | Loxham | May 16, 1950 |
| 2,509,749 | Thomson | May 30, 1950 |

FOREIGN PATENTS

| Number | Country | Date |
|---|---|---|
| 20,095 of 1911 | Great Britain | May 23, 1912 |
| 132,358 | Great Britain | Sept. 15, 1919 |

OTHER REFERENCES

Publ.: Automotive Industries, August 15, 1945, page 83.